US007918334B2

(12) United States Patent
Gaetano et al.

(10) Patent No.: US 7,918,334 B2
(45) Date of Patent: Apr. 5, 2011

(54) VERSATILE ENHANCED PRODUCTION LINE FOR PREPARING AND PACKAGING FOOD PRODUCTS

(75) Inventors: Giovanni Gaetano, Dublin, OH (US); Robert John Mazurek, Beauvais (FR); Thomas Clayton Pritchard, Bakersfield, CA (US)

(73) Assignee: Nestec S.A., Vevey (CH)

( * ) Notice: Subject to any disclaimer, the term of this patent is extended or adjusted under 35 U.S.C. 154(b) by 96 days.

(21) Appl. No.: 12/303,107

(22) PCT Filed: May 11, 2007

(86) PCT No.: PCT/EP2007/054553
§ 371 (c)(1),
(2), (4) Date: Dec. 1, 2008

(87) PCT Pub. No.: WO2007/141110
PCT Pub. Date: Dec. 13, 2007

(65) Prior Publication Data
US 2009/0250316 A1    Oct. 8, 2009

Related U.S. Application Data

(60) Provisional application No. 60/810,750, filed on Jun. 2, 2006.

(51) Int. Cl.
*B65G 29/00* (2006.01)
(52) U.S. Cl. .......... 198/867.12; 198/867.11; 198/867.14
(58) Field of Classification Search ............. 198/867.11, 198/867.12, 867.14, 803.14, 803.15
See application file for complete search history.

(56) References Cited

U.S. PATENT DOCUMENTS

| 2,546,262 | A |   | 3/1951  | Hatcher |
|-----------|---|---|---------|---------|
| 3,150,765 | A | * | 9/1964  | Ellis ........................ 198/867.14 |
| 3,538,997 | A | * | 11/1970 | Christine et al. ......... 198/867.12 |
| 3,587,829 | A | * | 6/1971  | Sorensen ................. 198/867.12 |
| 3,907,472 | A | * | 9/1975  | Lutsey ........................... 425/127 |
| 4,188,768 | A |   | 2/1980  | Getman .......................... 53/282 |
| 4,198,996 | A | * | 4/1980  | Keable et al. ................. 135/128 |

(Continued)

FOREIGN PATENT DOCUMENTS

EP          164 494        12/1985

(Continued)

OTHER PUBLICATIONS

International Search Report PCT/EP2007/054553 Dated Oct. 30, 2007.

*Primary Examiner* — James R Bidwell
(74) *Attorney, Agent, or Firm* — Winston & Strawn LLP (57) ABSTRACT

A method and device for manufacturing a viscous or semi-solid product. The device includes a versatile product holding tray for manufacturing or forming the product. This tray is a polygonal member that includes a top surface for receiving the liquid or semisolid product, and a plurality of sides wherein at least one side includes a registration recess that is configured and dimensioned to receive at least a portion of a retaining bar of an endless conveyor to facilitate positioning of the tray upon the conveyor so that the retaining bar advances the tray during manufacture of the product. The device also includes an endless conveyor that includes a plurality of spaced tray retainer bars thereon for holding and advancing the tray to one or more product forming stations for forming the product on the trays.

24 Claims, 6 Drawing Sheets

U.S. PATENT DOCUMENTS

| | | | |
|---|---|---|---|
| 4,560,139 A * | 12/1985 | Dahlke | 198/803.14 |
| 4,729,206 A | 3/1988 | Francis et al. | 53/297 |
| 4,778,045 A * | 10/1988 | Grune et al. | 198/867.12 |
| 5,065,670 A | 11/1991 | Leiweke | 99/405 |
| 5,178,260 A * | 1/1993 | Hochbein | 198/803.15 |
| 5,228,267 A | 7/1993 | Blankenship et al. | 53/397 |
| 5,322,432 A | 6/1994 | Gilje | 425/91 |
| 5,630,499 A * | 5/1997 | Louden et al. | 198/867.14 |
| 5,918,765 A | 7/1999 | Blankenship et al. | 221/221 |

FOREIGN PATENT DOCUMENTS

| | | |
|---|---|---|
| GB | 1 547 930 | 7/1979 |

* cited by examiner

VERSATILE ENHANCED PRODUCTION LINE FOR PREPARING AND PACKAGING FOOD PRODUCTS

This application is a 371 filing of International Patent Application PCT/EP2007/054553 filed May 11, 2007, which claims the benefit of application No. 60/810,750 filed Jun. 2, 2006.

BACKGROUND

The invention relates to a device and process for manufacturing a multi-step food product. This is applicable to manufacture of ice cream products, confectionery products, frozen foods, and decoration of baked goods.

Generally the device comprises a unique conveying member for carrying and transporting a plurality of holding members through the various product forming and processing stations or operations and facilitates relatively fast changeovers from one type product to another. More specifically, the device can be used for manufacture of a frozen confection or dessert generally in the form of an ice cream provided in a holding member such as a comestible shell or inedible receptacle for supporting or containing the product in a liquid, semisolid, semifrozen, viscous, solid, or frozen condition.

Frozen confections, desserts or products of this character have heretofore been made on production lines that generally include an endless conveyor having a supporting member with openings in the form of wires, apertures, or recesses that are designed to receive receptacles such as cones or shells or containers such as cups with the supporting member the carrying them through the various product forming, processing, cooling or freezing and packaging operations. The following patents illustrate representative devices and processes.

U.S. Pat. No. 4,729,206 discloses a typical endless conveyor having a generally horizontal upper run which includes plates having container receiving and supporting apertures for receiving and transporting containers for the product to be manufactured. As best shown in FIG. 2, the belt simply travels around a sprocketed drive but the apertures are particularly designed for the receipt of one particular product. U.S. Pat. Nos. 5,228,267 and 5,918,765 illustrate similar conveyors having apertures for receiving and transporting cones or containers. For these devices, if a different size or shape product is to be made which requires the use of a different size aperture, these plates must be removed, causing significant manpower and downtime to make such a change. Of course, it is possible to utilize different conveyors for different products, but this requires duplication of the product forming stations, and this adds costs as well as excess capacity for most high speed production lines.

U.S. Pat. No. 4,188,768 discloses an endless belt conveyor that is used to transport shells through several stations at which method steps are performed in producing the frozen end product. The conveyor engages pairs of sprockets of conventional motive means that is controlled to provide a periodically interrupted or step-by-step movement and has links connected with cone-supporting plates or members. Each plate is provided with a planar portion equipped with members or fittings having openings for accommodating and supporting cone assemblies. Each plate has cone assembly conveyor mounting means in the form of depending portions with openings to loosely receive pins or rivets which join the links with the plates. This enables the operator to select a particular cone assembly for making one type product but in the event of product changeover, the operator need to stop the line and replace the mounting means to one having different openings to accommodate the different products. While the pins or rivets can be designed to try to expedite this operation, it still requires downtime and a temporary cessation of production to make the changeover.

In attempting to solve changeover problems, U.S. Pat. No. 5,322,432 discloses an endless conveyor formed with transverse rows of holes each adapted to receive a preform to be filled with ice cream or other edible substances from an upper filler assembly adapted to move intermittently synchronically with the conveyor during operation of the thereof. Under an upper run of such first endless conveyor, in the area at the filler assembly, is a second endless conveyor adapted to move synchronically with the first endless conveyor and carrying transverse rows of movable suction cups which in turn can be lifted up through an overlaying row of the holes for engaging and removing a respective preform from a dispenser station in the filler assembly before the preform is lowered onto the first endless conveyor while holding it in correct position during the subsequent filling operations. A wall portion is radially spaced around each hole to prevent displacement of filled preforms resting on the first endless conveyor but not fitting into the holes. This arrangement is intended to allow the same trays to be used in the conveyor not only for conical products of varying sizes, but also for flat-bottomed cup products of highly deviating shape, so as to avoid the need to convert or replace the trays when different size products are to be made. While this appears to be an improvement over the previous devices, it is more complicated in that the suction cups and the necessary vacuum lines to create suction must be provided and maintained during operation.

Typical commercial equipment for filing cups and cones include the Hoyer Vicking CL4 machine for cones and either the Hoyer Vicking CC4 or the Vasito Chamonix Fill & Cup for cups. Generally, these machines fill around 100 to 200 cones or cups per minute with machine efficiencies ranging from around 80 to 90%. When product changeover is required, however, approximately one shift (8 to 10 hours) is usually required to complete the changeover in equipment along with the attendant cleaning operation.

Thus, improvements in the conveying devices needed for receiving and transporting shell or receptacle holding members are needed and desired, especially to provide a more efficient and effective process to facilitate and expedite product changeovers, and these are now provided by the present invention.

SUMMARY OF THE INVENTION

The invention relates to a new method and device for manufacturing a product requiring multiple processing or application steps. One embodiment of this device is a versatile product holding tray for manufacturing or forming the product. This tray comprises a polygonal member that includes a top surface for receiving the liquid, semisolid, solid or frozen product, and a plurality of sidewalls wherein at least one sidewall includes a registration recess that is configured and dimensioned to receive at least a portion of a retaining bar of a conveyor to facilitate positioning of the tray upon the conveyor and so that the retaining bar moves the tray during manufacture of the product.

The tray advantageously has at least two opposed sides that include a registration recess to facilitate positioning of the tray between two retaining bars of the conveyor, wherein each registration recess comprises a longitudinal groove that is configured and dimensioned to receive at least a portion of the circumference of a retaining bar of the conveyor.

The top surface of the polygonal member generally includes a plurality of recesses or apertures for receiving a receptacle for holding the product. Preferably, the polygonal member is rectangular and the apertures include a plurality of vertical supports for engaging a product receptacle with all sidewalls including a registration recess comprising a longitudinal groove that is configured and dimensioned to receive at least a portion of the circumference of a retaining bar of the conveyor. The bottom surface of the tray includes recesses configured and dimensioned to receive different sized receptacles when the tray is inverted, wherein the recesses are optionally aligned with the apertures.

Another embodiment of the invention relates to a method of manufacturing liquid, viscous, semisolid, solid, or frozen food products which comprises providing a conveyor that includes a plurality of repositionable, spaced tray retainer bars thereon; providing a plurality of trays each comprising a polygonal member that includes a top surface for receiving the liquid, viscous, semisolid, solid, or frozen food product, and a plurality of sidewalls wherein at least one sidewall includes a registration recess that is configured and dimensioned to receive at least a portion of a retaining bar of the endless conveyor; introducing the trays onto the conveyor by engaging the registration recess of a rear sidewall of the tray with a retaining bar that engages the recess; and moving the bar forward to move the tray to and from one or more product forming stations for forming the product on the trays. Preferably, the registration recess of the tray is positioned to meet at least one retaining bar circumferential portion of the conveyor irrespective of whether the tray is right-side up or is inverted.

Another embodiment relates to a method for minimizing product changeover times by providing the conveyor and trays disclosed herein, and providing a different product on subsequent trays. Alternatively, this method includes changing the position of the spacer bars on the conveyor to change the spacing therebetween, and then introducing different sized trays with different products onto the conveyor.

The invention also relates to a method for manufacturing at least two different products simultaneously which comprises providing the endless conveyor and trays disclosed herein, and providing different products on different portions of the trays. Alternatively, this method can include providing different products on different trays.

Yet another embodiment of the invention is a conveyor to carry out this method. The conveyor preferably includes an endless chain and one or more tray support rails, with the retainer bar including a circumference that is configured and dimensioned to be received within the registration recess and being mounted on the conveyor so that the bars follow the chain to move into position into engagement with the tray for advancing or withdrawing the tray past the product forming station(s) and then move out of the way of the tray to allow the tray to exit the conveyor. The tray is preferably designed to include at least two opposed sides that include a registration recess, and is placed between two retainer bars of the conveyor to secure the trays to the conveyor during movement of the tray past the product forming station(s). Any of the trays described herein can be used in the device and method of the invention.

Furthermore, the invention relates to a food production apparatus having improved cleanability which comprises the conveyor and trays disclosed herein, wherein the conveyor and retainer bars are made of solid stainless steel or solid plastic without closed cells so as to provide a sanitary open floor design and the trays are made of molded lightweight plastic and are configured to facilitate washing or cleaning.

BRIEF DESCRIPTION OF THE DRAWING FIGURES

The invention is more clearly understood by reference to the following drawing figures which illustrate preferred embodiments, wherein.

DETAILED DESCRIPTION OF THE PREFERRED EMBODIMENTS

The present invention provides a low cost and flexible production line for viscous or semi-solid foods such as puddings or ice cream wherein the line can be changed effortlessly from cups to cones for changeover from one product to another. The line is also adaptable to new product innovations, and is easily maintained and rapidly convertible to process different products. Such equipment can be used to develop distinctive and unique products that would otherwise be difficult to manufacture on conventional equipment. Furthermore, the efficient operation of such equipment results in lower costs for product formation and manufacture, and this results in lower consumer product prices as well as better quality products. Due to the its simplicity and flexibility of operation, the conveyor contributes to high production speeds of manufacturing about 240 to 480 products per minute.

FIGS. 1, 2, 2A and 2B depict the innovative design of a product holding tray according to the invention. The tray 10 is typically configured to be a carrier of a plurality of receptacles for receiving a viscous, semisolid or semifrozen food as well as for receiving additionally applied coatings, toppings, flavorings, or other components necessary to manufacture a final product. The term "receptacle" is used herein to designate any edible or non-edible container that is used to hold the food and its components. Edible containers typically include cones, shells, wafers, baskets or confectioneries, while non-edible containers typically include paper or plastic cups, sleeves or other food holding members. The trays are typically designed to carry a plurality of such receptacles though various stations that form and otherwise manufacture the products. This is conveniently achieved by providing the trays with a plurality of apertures or holes 70 into which the receptacles can be received.

Figure 1:
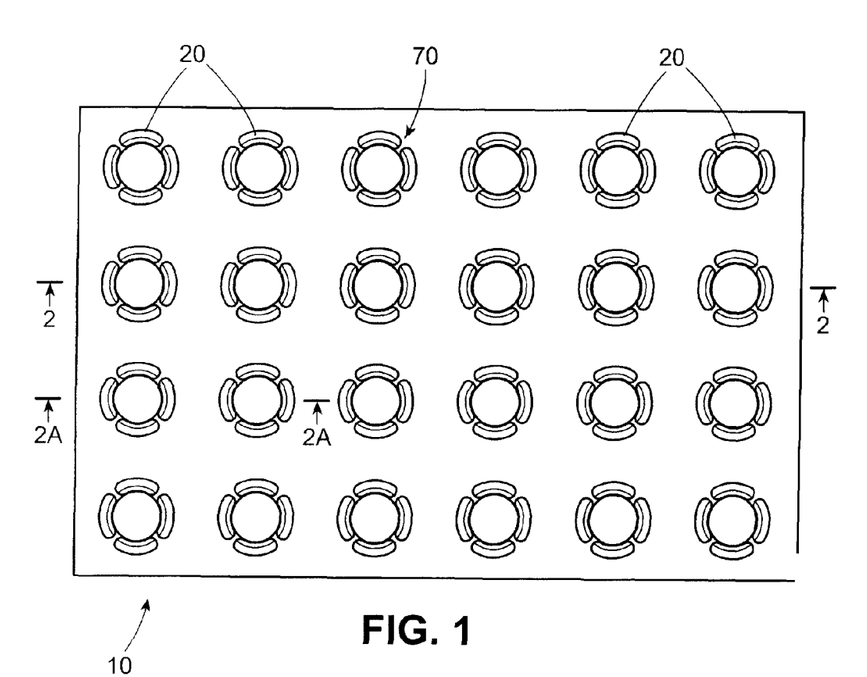
FIG. 1 is a top view of a unique product holding tray for retaining and transporting receptacles along the conveyor of the present invention.

Although shown with holes or apertures in FIG. 1, the tray of the invention can also be made with recesses rather than holes. The recesses can be sized and shaped to receive a cookie, cake, confectionery or other support that is either edible or non-edible for receiving the viscous or semi-solid food thereon. For example, a rectangular recess can be used to define an area that is to receive the cake portion of an ice-cream sandwich, and then an ice-cream can be deposited thereon prior to applying to top cake portion of the sandwich. If an ice cream cake is to be made, the tray surface can be flat or can contain a smaller recess or other defined area for receiving a cake support, such as a cardboard or plastic sheet, upon which the ice cream and other components are applied to form the cake.

The tray 10 includes a rear sidewall that is provided with a longitudinal groove or depression 30 for receiving at least a portion of the circumference of a retaining bar from an endless conveyor. While the depression can be a shoulder on the top edge of the rear sidewall, it has been found that a groove 30 is of greater value to allow the tray to receive the retaining bar which pushes the tray forward as the bar advances with the conveyor chain. For securing the tray onto the conveyor, the front sidewall can be provided with a similar registration groove for engaging at least a portion of the circumference of a retaining bar that is positioned ahead of the tray on the conveyor. This enables the additional bar to hold the tray securely during movement along the conveyor and to and from or through the product formation stations.

Figure 2:
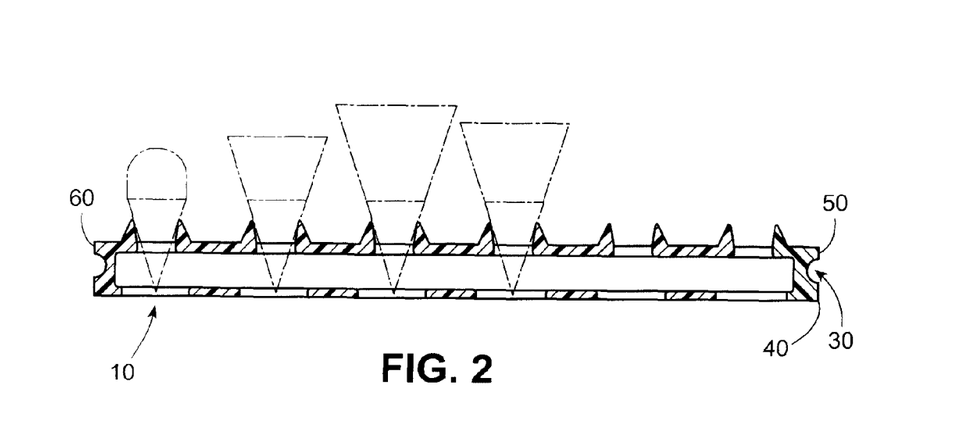
FIG. 2 is a cross-sectional view of the product tray of FIG. 1, taken along lines 2-2 thereof.
Figure 2A:
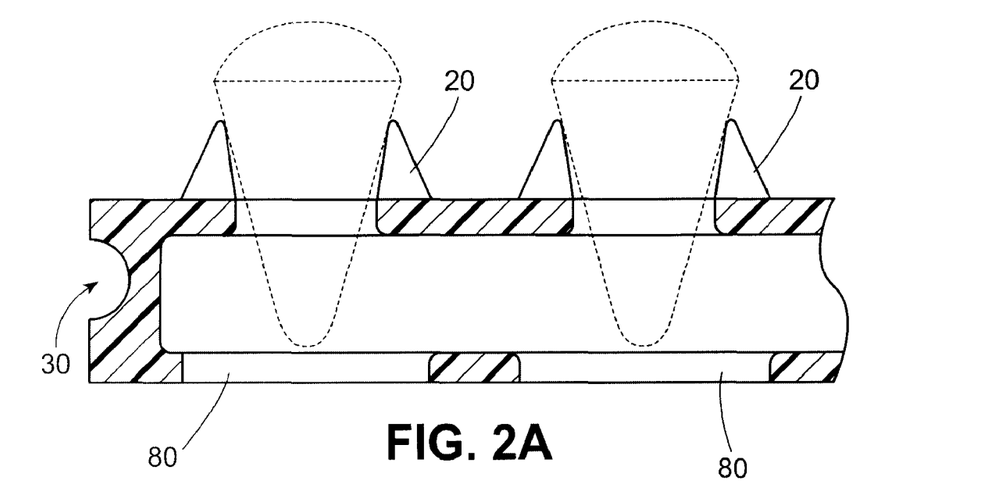
FIG. 2A is a partial sectional view of the product tray of FIG. 1 in an upright position.
Figure 2B:
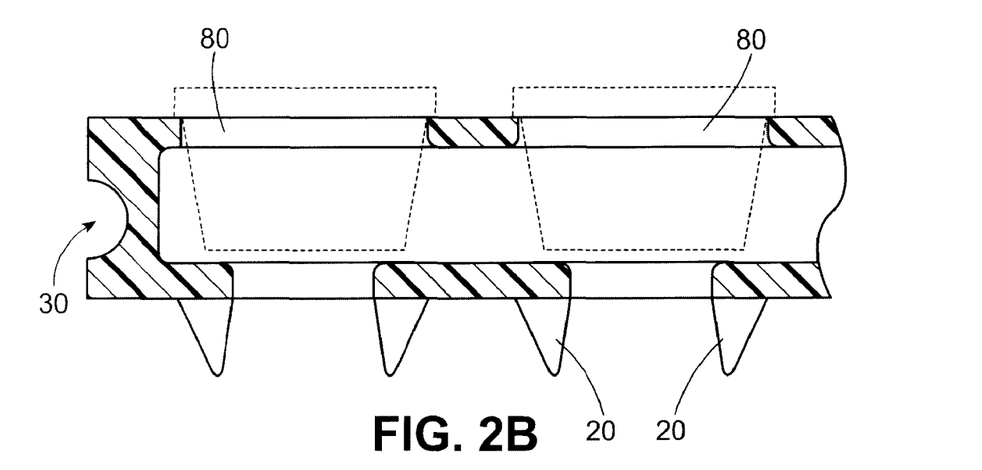
FIG. 2B is a partial sectional view of the product tray of FIG. 1 in an inverted position.

In one arrangement, the side(s) of the tray include the registration groove and also have a symmetrical configuration both above and below this groove. This allows the tray to be fed into the conveyor right side up, or upside down, and this enables a single tray to have dual functionalities for accommodating different products such as by having different receiving apertures, depressions or product receiving areas on the top and bottom of the tray as will be further described herein. FIGS. 2, 2A and 2B illustrate the bar retaining groove 30 in greater detail. Alternatively, the lower side of the sidewall that has the groove can be sloped 40 if necessary to facilitate movement of the retaining bar into in the groove 30. As the tray 10 can be used in an upright or inverted position, both the lower and upper sides of the sidewall can be sloped or angled to facilitate movement of the retaining bar into in the groove 30 regardless of the position of the tray 10.

In a preferred arrangement, at least both the leading edge 50 of the tray, i.e., that edge or side that is initially fed into the conveyor, as well as the trailing edge 60 of the tray, i.e., the rear end of the tray, include this groove or depression. This enables the tray to be engaged at its forward and rear ends with a retaining bar so that the trays are securely held in place as they move along the conveyor. Such securement assures proper placement and registration of the trays and the cups or cones that are being transported in the proper position for receiving the food products, toppings, inclusions, coatings or other components during manufacture.

Although shown with the registration recess provided on the sidewall(s) of the trays, the registration recess can be provided in other locations. For example, the registration recess can be provided on the lower or upper edge of the tray sidewall, or can be position on the top or bottom surface of the tray as desired. One recess may be sufficient for certain trays while other trays may require two or even more. The skilled artisan is capable of designing a number of different arrangements for the registration recess, and all such arrangements are contemplated by the present invention. As disclosed herein, the most preferred embodiment is the provision of a registration recesses on both the forward and rearward sidewalls of the tray, so that the trays are held securely as they move through the product forming machine.

The tray 10 can be of any desired shape but it has been found that one having a rectangular or square perimeter is the most desirable. The dimensions of the tray can be such that only a single tray engages the retaining bar or a plurality of trays aligned in adjacent relation are contacted by a single retaining bar. The size of the trays will depend upon the width of the conveyor and the way that the trays are to be handled after the product is manufactured, with the main concern being the weight and bulkiness of the trays after the products are manufactured. When automated handling is provided, the size and weight of the trays is of less concern provided that they are within the mechanical handling capabilities of the equipment.

In many situations, however, especially on smaller lines, the trays are manually moved by operators between certain stations, so that the trays must be made of a manageable size containing a reasonable number of apertures or product holders so that the operator can lift and handle them after the products are manufactured. Also, smaller trays enable different products to be manufactured at one time. For example, one tray can hold cones while another tray holds cups, with each receptacle being provided with the same food and components therein. When multiple trays are used it is often convenient to include registration members on the sides of the trays that contact each other. Such members can be one or more depressions or recesses on one tray and one or more mating tabs or pins on the adjacent tray.

For versatility and interchangeability of use, it is sufficient to form the trays of rectangular shape that can fit against the retaining bars with the longer side of the tray placed first or where two side by side trays are placed adjacent each other with the shorter side of each tray contacting the bar. For example a tray that has a length that is twice its width can meet this arrangement, but a number of other variations can be devised by skilled artisans. For these trays, all side portions of the trays can be provided with the longitudinal bar engaging depressions or grooves so that any side of the trays can be fed first into the conveyor.

The apertures 70 are sized sufficiently to receive a number of different sized products such as cones or cups therein. Since cones have varying diameters along their length, the trays can accommodate different sizes with the other manufacturing stations designed to provide the necessary quantities of food product or enhancements such as inclusions, toppings, syrups, flavorings, etc. to product the desired size. A number of different sized cups with sloped walls can be accommodated in a similar manner. FIG. 2 illustrates in phantom a number of different sized products and how they can be accommodated by the tray 10. While the usual arrangement would be to have the same size product in any one tray, it is also within the scope of this invention to have different sized products in each row of apertures of the tray so that the same product passes beneath the same processing stations in the product forming machine.

It is also useful to provide vertical supports 20 that assist in retaining the cones or cups in the apertures. These vertical supports can be configured in the form shown, as a plurality of spaced, upstanding sloped wall portions that can engage various sizes of cones or cups. While it is possible to use a cylindrical wall that surrounds the hole, it is preferred to use spaced wall portions 70 to facilitate placement of the cones or cups by e.g., a pick and place device. Providing wall portions 20 rather that a complete cylindrical wall also facilitates cleaning of the trays. The specific sizes and configurations of the wall portions is not critical and would be designed to accommodate the desired sizes of receptacles and products that are intended to be manufactured. While it is generally intended that the wall portions be uniform on all holes for any one particular tray, there may be situations where rows of different sized wall portions are necessary, and these can easily be provided when desired.

The top surface of the tray generally includes the wall portions 20 so that different receptacle sizes can be accommodated, but the tray can be inverted with no such portions being provided on the lower surface. This enables the tray to simply be inverted to then accommodate different size receptacles. FIGS. 2A and 2B illustrate these features. FIG. 2A shows how the wall portions 20 support a cone for transport through an ice cream manufacturing machine. The tray is designed with a hollow interior at least beneath the apertures 70 so that a portion of the cone can be accommodated inside of the tray, thus conserving space and minimizing the vertical thickness dimension for the tray 10. When the tray is inverted, as shown in FIG. 2B, the previously lower surface now is the top surface of the tray, and it is provided with apertures or recesses (shown as 80 in FIG. 2B) that support a different size receptacle, such as the cups that are shown in phantom. As with the cone aperture 70, at least that portion of the tray beneath the recesses 80 are hollow interior so that a portion of the cup can be accommodated inside of the tray. A skilled artisan will readily recognize the advantages and benefits of versatility and rapid interchangeability of trays having these features in particular to facilitate the manufacture of different products.

The trays are preferably made of a molded engineering thermoplastic that has sufficient strength to withstand the temperatures and handling as they pass through the various stations as well as when they need to be transported to and from the conveyor. Any of a wide variety of such plastic materials are suitable for this purpose but with ultra high molecular weight polyethylene for ice cream production being preferred due to their combined properties of strength and impact properties as well as their resistance to the temperature ranges anticipated for manufacturing the desired products. The molding of the tray enables a one-piece lightweight construction to be achieved, and this facilitates handling and cleaning of the trays. Furthermore, the apertures and hollow interior of the tray allows cleaning fluids to be sprayed or otherwise provided in the tray for removal of contaminants as well as to allow egress of the fluids from the tray to facilitate drying of the trays prior to re-use in the product forming machine.

Before entering the conveyor, the trays 10 can be filled with receptacles in a conventional manner. Receptacle loading into the trays can also be accomplished at the first processing station of the device. If desired, container dispensers or sleeve, cone, and cup dispensers can be automatically dispensed onto the trays. Instead, the trays can be provided with receptacles offline and then fed into the conveyor manually by the operators.

Any of a wide varieties of conveyors can be used according to the invention. In the preferred embodiment, the conveyor is on that has an endless chain upon which the tray retainer bars are mounted in a repositionable manner. It is contemplated herein that other conveyors can be utilized, since all that is required is that the conveyors be capable of mounting the retainer bars in the appropriate position for movement of the trays in a forward or reverse direction, or back and forth, to pass the trays to and from various product forming stations as necessary. In the most preferred arrangement, as noted herein, the conveyor moves the trays in one direction past the desired number of product forming stations until the end where the trays and filled products are removed for further processing or packaging.

Construction of the conveyor can be of stainless steel without closed cells so as to provide a sanitary open floor design. A skilled artisan is aware of this type design which utilizes all brackets and mounts made of solid materials, such as rails or supports made of solid plastic or metal depending upon load capacities, coefficients of friction and the like. Such construction is easily cleaned and avoids locations where microbes could grow. For example, a closed cell structure refers to a hollow structure such as a box tube or pipe that is often used as a support structure in other machines due to its light weight and relatively high strength. The present invention preferably avoids or at least greatly minimizes the use of such closed cell materials of construction in order to avoid microbe contamination, since such materials and structures can fill up with water and grow microbes due to cracks or punctures. Accordingly, the conveyor chain, sprocket and retainer bars are all made of stainless steel to withstand cleaning and avoid such problems.

Also, as noted above, the molded plastic trays are lightweight and easy to handle as well as being designed to facilitate washing or cleaning when necessary. In particular, the lower surface of the tray is relatively smooth with no areas where food materials can collect and generate microbial growth. This lower surface can be easily washed to remove any food materials with the holes facilitating the introduction and drainage of the wash water.

The trays with receptacles placed therein can be conveyed past or through a plurality of product manufacturing stations. For example, when ice confections are to be made, the receptacle bearing trays typically pass by stations that (1) dispense particulate materials such as nuts, candy, cookie crumbs or fruit pieces into the receptacle alone or in combination and either simultaneously or sequentially, (2) spray or squirt one or more chocolate or other coating or flavoring materials alone or in combination either simultaneously or sequentially onto or into the receptacle, or even to form the receptacle; (3) one or more ice cream, sorbet or other ice confections in semisolid form, either continuously or intermittently, alone or in combination either simultaneously or alternatively; (4) dispense one or more solid or liquid topping materials simultaneously or sequentially. Depending upon the specific product to be manufactured, the order of the stations or the use of multiple stations for providing such materials can be used. For example, certain products may require the addition of fruits and nuts at two different stations, or the use of two different color or flavor ice creams, at one or multiple stations, etc. Also, for ice confections, the same ice cream filling valves can be used for both cones or cups. Also, when cones are to be produced, the stations can include spraying systems, rim dipping systems and centrifugal depositors to achieve the desired application of chocolate, syrup or other flavorings.

Another requirement when ice confections are to be manufactured is that the dispensed semi-solid material must be subjected to solidification by passing through a freezing tunnel. The simple design of the present conveyor and trays enables the conveyor to run directly through a conventional freezing tunnel, or the trays with filled receptacles can be easily transferred from the end of the production line to a separate conveyor that carries the trays through the freezing tunnel. To conserve space a spiral cooling tunnel such as that which is available from Frigoscandia or any generic spiral freezing tunnel with a flat belt can be used. To the extent that the freezing tunnel has a different conveying belt, the tunnel can be placed at the end of the present conveying device and the product trays can be transferred to the freezing tunnel belt. A skilled artisan can readily determine the optimum arrangement of conveyors and freezing or refrigeration equipment for the manufacture of any particular viscous or semi-solid product. As the trays, receptacles and products are lifted or otherwise moved together, the possibility of breakage or damage to the product is minimized and certainly is much less that when using pick and place equipment to individually move or transfer such products.

Additional stations can include the application of lids to the receptacles, the application of product marking to the exposed areas of the receptacle or lids, as well as a final packaging stations as necessary for the particular product.

Figure 3:
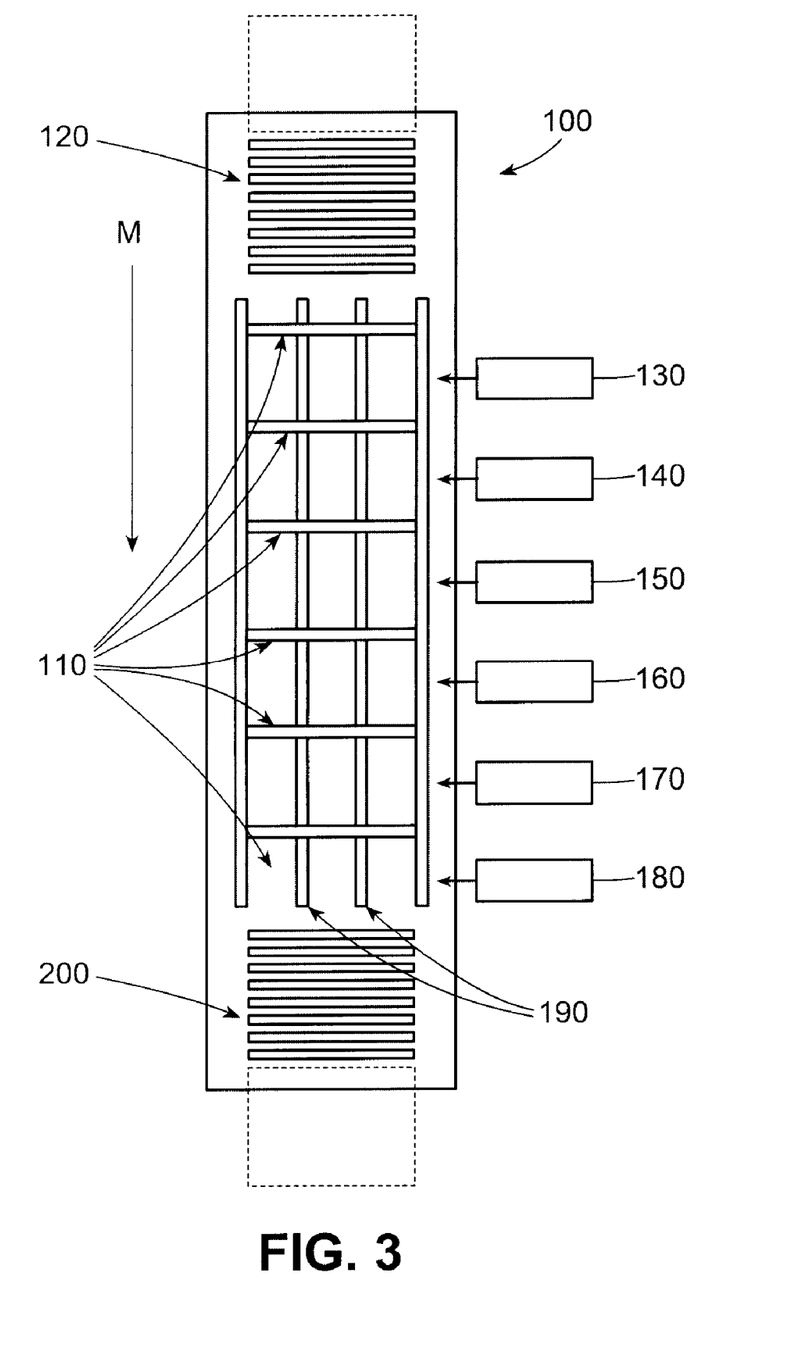
FIG. 3 is an overhead schematic view of the conveyor device of the invention to illustrate the uploading, movement, processing and offloading of the product trays.

FIG. 3 is a schematic of the device of the invention when viewed from above to illustrate potential configurations. The conveyor is shown at 100, with the retaining bars shown as 110. Trays shown in dotted lines are fed into the conveyor by placement and advancement in direction M along rollers 120 until engaged by a retaining bar 110. The conveyor 100 moves the trays past the desired number of product forming stations 130 to 190. These would be placed above the conveyor but for illustrative purposes they are shown alongside conveyor 100. Such stations can include, e.g., the sequential application of a chocolate coating at 130, inclusions at 140, a first ice cream at 150, a second ice cream at 160, a flavored topping at 170, and sprinkles at 180. These stations are generally known so that no further description need be provided herein. A skilled artisan can select the appropriate number and types of stations to achieve the desired product and the conveyor run can be selected and configured accordingly.

The trays move along or above rails 190 while passing past the stations and then after the products are formed exit the conveyor by moving along rollers 200 until being removed by an operator for transfer of the tray 10 to another conveyor which will advance the trays and products through a freezing tunnel before final transfer and advancement through a packaging line. Of course it is also possible to configure additional conveyors to handle and manufacture the product with additional product component adding stations being provided after the product exits the freezing tunnel and prior to packaging. The simplicity of the conveying device allows any of a wide variety of combinations to be easily achieved.

Figure 4:
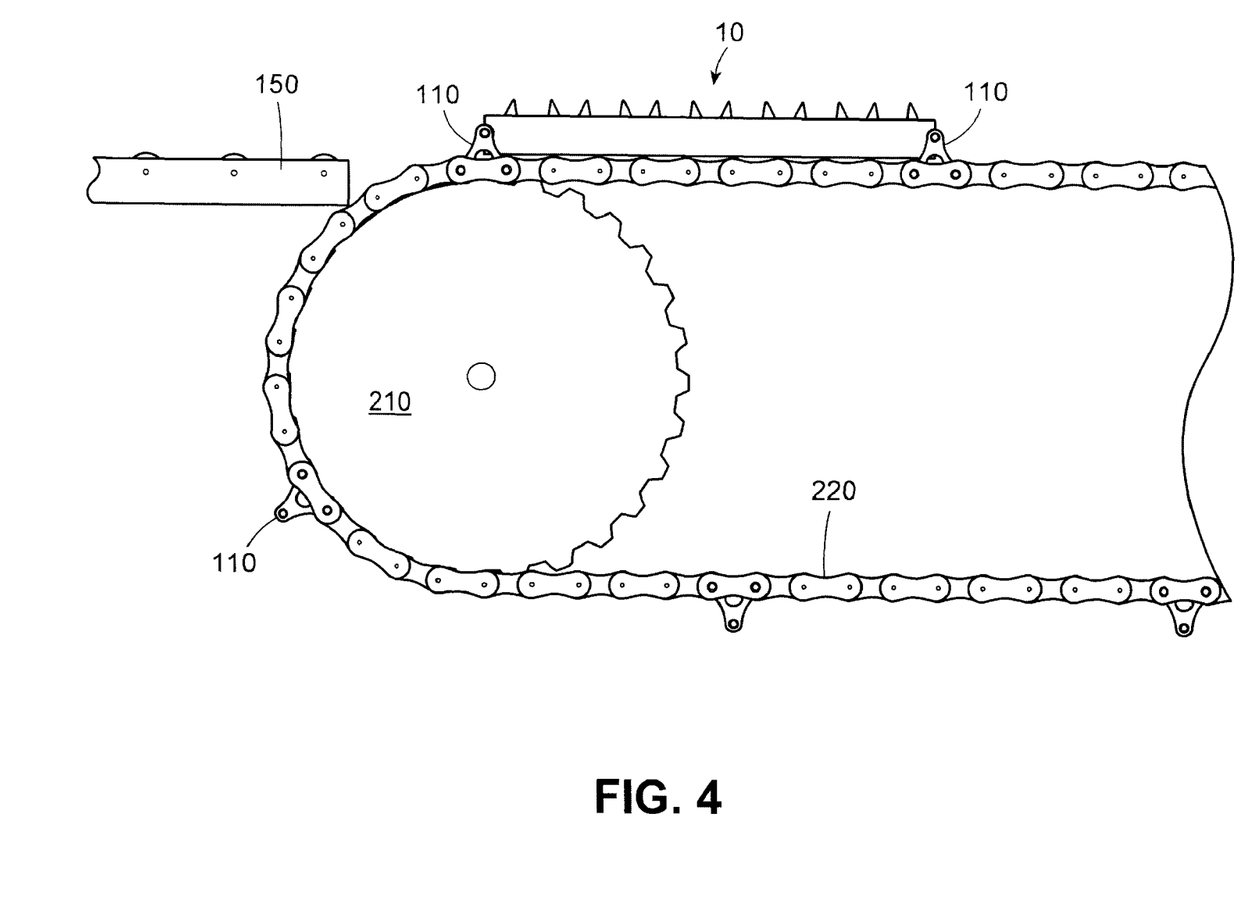
FIG. 4 is a side schematic view of an endless conveyor to show engagement and movement of the retaining bars and product trays thereon.
Figure 5:
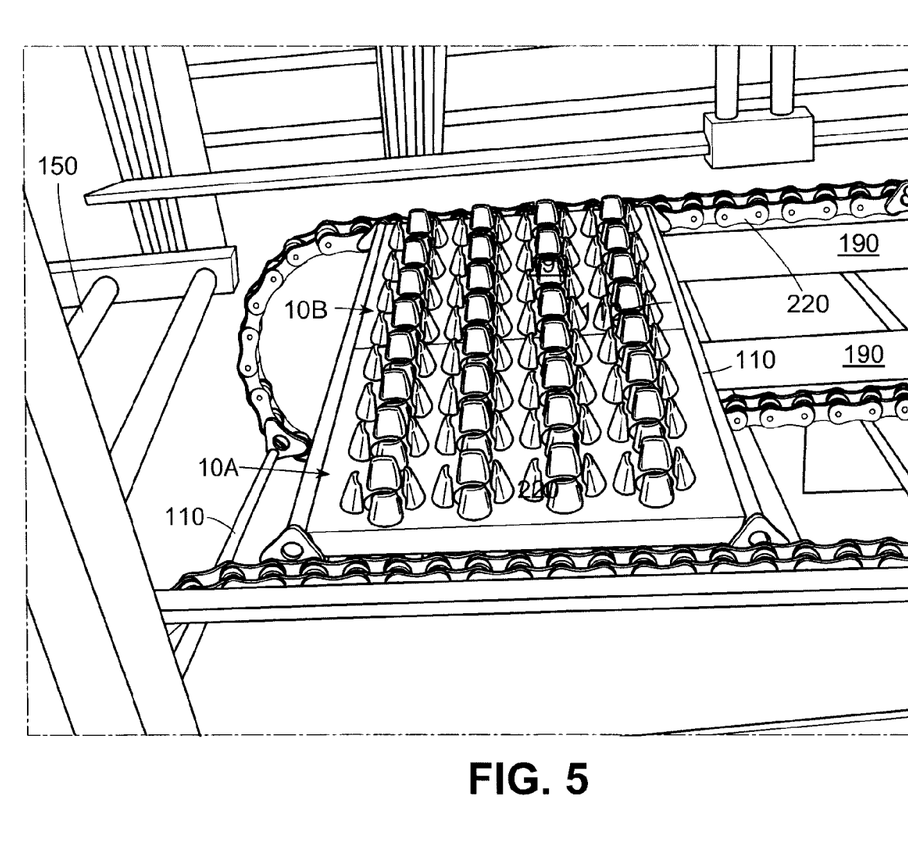
FIG. 5 is a perspective view of the endless conveyor carrying a tray through an ice cream manufacturing machine with the tray engaged with the bar and moving along the conveyor.

FIGS. 4 and 5 illustrate the positioning of the retaining bars 110 on the conveyor and how they engage the tray 10 for movement therealong. To load the conveyor the tray is slid along stationery conveyor 150 and onto the endless conveyor chain 220 until the forward edge of the tray contacts a retaining bar 110. The bar prevents forward movement of the tray and properly positions it on the conveyor chain 220. The rear conveyor sprocket 210 rotates to advance endless chain 220 and retaining bar 110 into position ahead of the tray 10. This sprocket 210 can be driven or can be idle depending upon whether the sprocket on the other end of the conveyor is driven or idle. A skilled artisan can design the driven and idle sprockets depending upon the desired performance of the conveyor. As noted, the tray 10 is gently urged against the bar 110 to engage the bar with the groove 30. Such urging can be performed by manually by an operator or automatically by a conventional automatic tray advancement mechanism.

As shown, the endless chain supports a number of retainer bars and these are positioned to carry the trays through the product forming machine. FIGS. 4 and 5 illustrate these bars 110 in engagement with the tray 10 and beginning its travel to the product forming stations. The spacing between the bars is shown without additional trays, but the skilled artisan realizes that a tray (or a plurality of adjacent trays) would be provided between each pair of retainer bars to allow continuous operation. The second or rearward bar engages the longitudinal groove 30 on the rearward end of the tray to push it along the path past the product forming stations. As can be understood, the bars are placed before and after the trays to securely retain the trays during movement along the path, but the bars are sandwiched between two sets of trays, whereas one bar pushes the tray or trays that are in front of the bar while holding and properly positioning the tray or trays that are behind that bar. FIG. 5 illustrates two trays 10A, 10B, in side by side relation and held in place by the retaining bars 110.

At the end of the conveyor, the forward bar 110 begins to disengage from the tray and move out of the way by following the travel of the chain 220 around a forward sprocket, which as noted can be idle or driven as desired. In a preferred embodiment, the rearward sprocket is driven and the forward sprocket is idle. The trays then move along support rails 190 and onto exit rollers (not shown) for removal from the conveyor by the operators.

The basic layout for the conveyor is a pair of endless chains mounted on a pair of sprockets, one of which is driven and the other of which is idle or driven as required by the size of the conveyor and the weight of the trays and products to be transported. These chains provide a movable support to which the retainer bars can be attached and mounted. The bar 110 has a cross-section that is configured and dimensioned to fit at least partially within or mate with the recess to provide secure holding of the tray during movement along the conveyor. While bars and recesses of any polygonal or arcuate shape can be used, it is preferred to use bars having a cylindrical or square cross-section. Thus, as shown, an arrangement of a cylindrical bar and an arcuate recess that corresponds to a portion of the cylindrical surface of the bar is most preferred for simplicity of implementation. To facilitate mating of the bar and recess, the bars can be configured to rotate their chain mounting attachment. Of course, this is not required for all conveyors and a fixed or non-rotatable bar is suitable for most situations.

Figure 6:
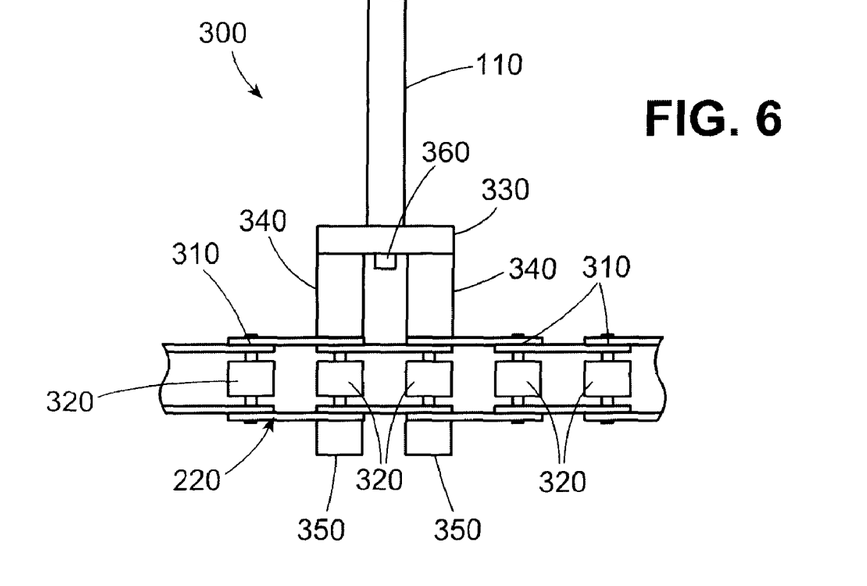
FIG. 6 is a top view of a retaining bar and its connection to the conveyor.
Figure 7:
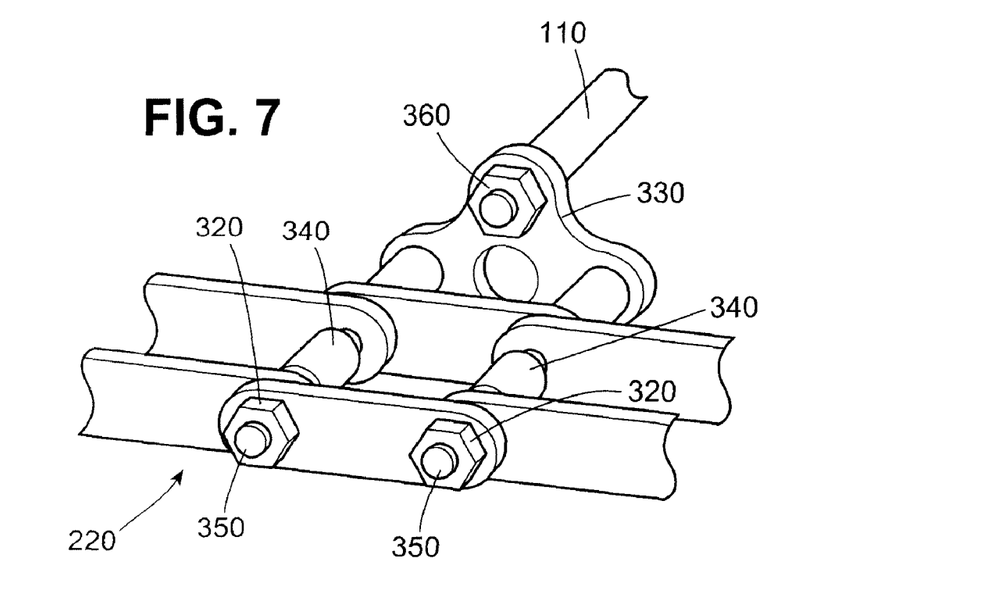
FIG. 7 is a side view of the retaining bar and its connection to the conveyor.

FIGS. 6 and 7 illustrate a preferred way for attaching the retainer bars to the endless chain through the use of a mounting assembly 300. The chain 220 is configured with conventional links but the links are connected by tubular pins 310. These tubular pins also pass through a plastic wheel or disc 320 which facilitates rolling movement of the chain on a guide or raceway. The greater importance of the tubular pins 310 is that they enable connection of the retaining bar mounting pieces on any pair of adjacent links. This enables the bars to be spaced at a desired distance for receiving the intended tray size for manufacturing one product. When significantly different size trays are to be accommodated, the spacing between the bars can be adjusted by simply moving the mounting pieces to a different pair of chain links. Such a changeover can be simply and quickly accomplished in a few hours, and the versatility of the removable and multi-positionable trays allows cleaning and provision of the trays with different receptacles while the bars are being re-positioned on the chains. This results in a rapid changeover that enhances actual production time for the manufacture of the products. The bar 110 is mounted upon and attached to the chains through a mounting plate 330 and spacers 340. The mounting plate 330 is attached to the chain links by two bolts 350 passing through the tubular pins of adjacent links. These bolts pass through spacers and then engage threaded apertures in the mounting plate. Alternatively the bolts can pass through the mounting plate and be held in position with nuts and lock washers. The upper portion of the mounting plate 330 is used to attach the retaining bar itself. Another bolt 360 can pass through the mounting plate 330 and then engage threaded apertures in the bar 110, or the bar can be provided with an axel or spindle that extends through the plate and is secured thereto a nut and lock washer. This simple attachment enables rapid installation and, when necessary, detachment for re-positioning.

It is to be understood that while receptacles preferably in the form of cones, shells or cups are filled with a dairy constituent such as ice cream or ice milk, they may be filled with other foods, including liquid, viscous, semisolid, solid, or frozen foods can be manufactured in the same manner except with different flavorings, toppings or other components.

A preferred type of product for manufacture according to the present invention is a frozen confection, such as cream cones that include coatings, toppings or other decorations. In addition to frozen confections or desserts, the invention is applicable to other products as well, such as assembling pizzas or decorating baked goods. Essentially, any product requiring a multi-step assembly or that requires cleaning or product versatility such as multi-stage confectionery products or multi-layered/multi-coated products, can be easily and efficiently manufactured by the present invention.

What is claimed is:

1. A versatile product holding tray for processing a liquid, semisolid, solid or frozen product, which comprises a removable polygonal member that includes a top surface for receiving the liquid or semisolid product, and a plurality of sidewalls wherein at least one sidewall includes a registration recess that is configured and dimensioned to receive at least a portion of a removable retaining bar of a conveyor to facilitate positioning of the tray upon the conveyor so that the retaining bar moves the tray during manufacture of the product, wherein the retaining bar can be repositioned or replaced by another retaining bar of a different size or shape to facilitate replacement of the removable polygonal member with another polygonal member.

2. The tray of claim 1 which has at least two opposed sides that include a registration recess to facilitate positioning of the tray between two retaining bars of the conveyor, wherein each registration recess comprises a longitudinal groove that is configured and dimensioned to receive at least a portion of the circumference of a retaining bar of the conveyor.

3. The tray of claim 1 wherein the top surface of the polygonal member includes a plurality of projections, recesses or apertures for receiving a receptacle for holding the product.

4. The tray of claim 3 wherein the polygonal member is rectangular and the apertures include a plurality of vertical supports for engaging a product receptacle with two opposed sidewalls including a registration recess comprising a longitudinal groove that is configured and dimensioned to receive at least a portion of the circumference of a retaining bar of the conveyor.

5. The tray of claim 3, further comprising a bottom surface that includes recesses configured and dimensioned to receive different sized receptacles when the tray is inverted, wherein the recesses are optionally aligned with the apertures.

6. A method of manufacturing liquid, viscous, semisolid, solid or frozen food products which comprises;
providing a conveyor that includes a plurality of spaced tray retainer bars thereon;
providing a plurality of trays each comprising a polygonal member that includes a top surface for receiving the liquid, viscous, semisolid, solid or frozen food product, and a plurality of sidewalls wherein at least one sidewall includes a registration recess that is configured and dimensioned to receive at least a portion of a retaining bar of the endless conveyor;
introducing the trays onto the endless conveyor by engaging the registration recess of a rear sidewall of the tray with a retaining bar that engages the recess; and
moving the bar to move the tray to one or more product forming stations for forming the product on the trays;
wherein the conveyor includes an endless chain and one or more tray support rails and the retainer bar includes a circumference that is configured and dimensioned to be received within the registration recess, and the method further comprises mounting the retainer bars on the conveyor so that the bars follow the chain to move into position into engagement with the tray for advancing the tray past the product forming station(s) and then moving below the tray to allow the tray to exit the conveyor.

7. The method of claim 6, wherein each tray includes at least two opposed sidewalls that include a registration recess, and is placed between two retainer bars of the conveyor to secure the trays to the conveyor during movement of the tray to or from the product forming station(s).

8. The method of claim 7, wherein each registration recess comprises a longitudinal groove that is configured and dimensioned to receive at least a portion of the circumference of a retaining bar of the conveyor to facilitate engagement with the retaining bar circumferential portion.

9. A method of manufacturing liquid, viscous, semisolid, solid or frozen food products which comprises;
providing a conveyor that includes a plurality of spaced tray retainer bars thereon;
providing a plurality of trays each comprising a polygonal member that includes a top surface for receiving the liquid, viscous, semisolid, solid or frozen food product, and a plurality of sidewalls wherein at least one sidewall includes a registration recess that is configured and dimensioned to receive at least a portion of a retaining bar of the endless conveyor;
introducing the trays onto the endless conveyor by engaging the registration recess of a rear sidewall of the tray with a retaining bar that engages the recess; and
moving the bar to move the tray to one or more product forming stations for forming the product on the trays;
wherein at least one sidewall of each tray includes the registration recess positioned to meet the at least one retaining bar of the conveyor irrespective of whether the tray is right-side up or is inverted.

10. The method of claim 6, wherein one retainer bar engages and moves at least two trays of similar or different configurations and the top surface of the polygonal member of the tray includes a plurality of recesses or apertures for receiving a receptacle for holding the product.

11. The method of claim 10, wherein the polygonal member of each tray is rectangular and the apertures include a plurality of vertical supports for engaging a product receptacle with at least two opposed sidewalls including a registration recess comprising a longitudinal groove that is configured and dimensioned to receive at least a portion of the circumference of a retaining bar of the conveyor.

12. The method of claim 11, wherein the trays include a bottom surface having recesses configured and dimensioned to receive different sized receptacles when the tray is inverted and is placed on the conveyor, wherein the recesses are optionally aligned with the apertures.

13. A method for minimizing product changeover times by use of a conveyor and trays, which comprises:
providing the conveyor and trays according to the method of claim 6, and
providing a different product on subsequent trays.

14. A method for minimizing product changeover times by use of a conveyor and trays, which comprises:

providing the conveyor and trays according to the method of claim 6, wherein the spacer bars are repositionable on the conveyor; and changing the position of the spacer bars on the conveyor to change the spacing therebetween, so that different sized trays carrying different products can be introduced onto the conveyor.

15. A method for manufacturing at least two different products simultaneously which comprises:

providing the conveyor and trays according to the method of claim 6, and providing different products on different portions of the trays.

16. A method for manufacturing at least two different products simultaneously which comprises:

providing the conveyor and trays according to the method of claim 6, and providing different products on different trays.

17. A conveyor for advancing trays for manufacturing liquid, viscous semisolid, solid or frozen food products, which comprises:

a conveyor that includes a plurality of spaced tray retainer bars thereon; and a plurality of trays each comprising a polygonal member that includes a top surface for receiving the viscous or semisolid food product, and a plurality of sides wherein at least one side includes a registration recess that is configured and dimensioned to receive at least a portion of a retaining bar of the conveyor;

wherein the trays are introduced onto the endless conveyor by engaging the registration recess of a rear sidewall of the tray with a retaining bar that engages the recess;

the conveyor and retaining bar move to move the tray to one or more product forming stations for forming the product on the trays; and the conveyor includes an endless chain and one or more tray support rails, with the retainer bar including a circumference that is configured and dimensioned to be received within the registration recess and being mounted on the conveyor so that the bars follow the chain to move into position into engagement with the tray for advancing or withdrawing the tray past the product forming station(s) and then disengage from the tray to allow the tray to exit the conveyor.

18. The conveyor of claim 17, wherein each tray includes at least two opposed sides that include a registration recess, and is placed between two retainer bars of the conveyor to secure the trays to the conveyor during movement of the tray to and from the product forming station(s).

19. The conveyor of claim 18, wherein each registration recess comprises a longitudinal groove that is configured and dimensioned to receive at least a portion of the circumference of a retaining bar of the conveyor.

20. The conveyor of claim 17, wherein one retainer bar engages and moves at least two trays and the top surface of the polygonal member of the tray includes a plurality of recesses or apertures for receiving a receptacle for holding the product.

21. The conveyor of claim 20, wherein the polygonal member of each tray is rectangular and the apertures include a plurality of vertical supports for engaging a product receptacle with all sidewalls including a registration recess comprising a longitudinal groove that is configured and dimensioned to receive at least a portion of the circumference of a retaining bar of the conveyor.

22. A conveyor for advancing trays for manufacturing liquid, viscous semisolid, solid or frozen food products, which comprises:

a conveyor that includes a plurality of spaced tray retainer bars thereon; and a plurality of trays each comprising a polygonal member that includes a top surface for receiving the viscous or semisolid food product, and a plurality of sides wherein at least one side includes a registration recess that is configured and dimensioned to receive at least a portion of a retaining bar of the conveyor;

wherein the trays are introduced onto the endless conveyor by engaging the registration recess of a rear sidewall of the tray with a retaining bar that engages the recess; and the conveyor and retaining bar move to move the tray, wherein the trays include the top surface of the polygonal member having a plurality of recesses or apertures for receiving a receptacle for holding the product and a bottom surface having recesses configured and dimensioned to receive different sized receptacles when the tray is inverted and is placed on the conveyor, wherein the recesses of the bottom surface are optionally aligned with the apertures of the top surface.

23. A food production apparatus having improved cleanability which comprises the conveyor and trays according to claim 17, wherein the conveyor and retainer bars are made of solid stainless steel or solid plastic without closed cells so as to provide a sanitary open floor design and the trays are made of molded lightweight plastic and are configured to facilitate washing or cleaning.

24. The conveyor of claim 22, wherein the retaining bar and polygonal member are both removable so that retaining bar can be repositioned or replaced by another retaining bar of a different size or shape to facilitate replacement of the removable polygonal member with another polygonal member.

* * * * *